UNITED STATES PATENT OFFICE.

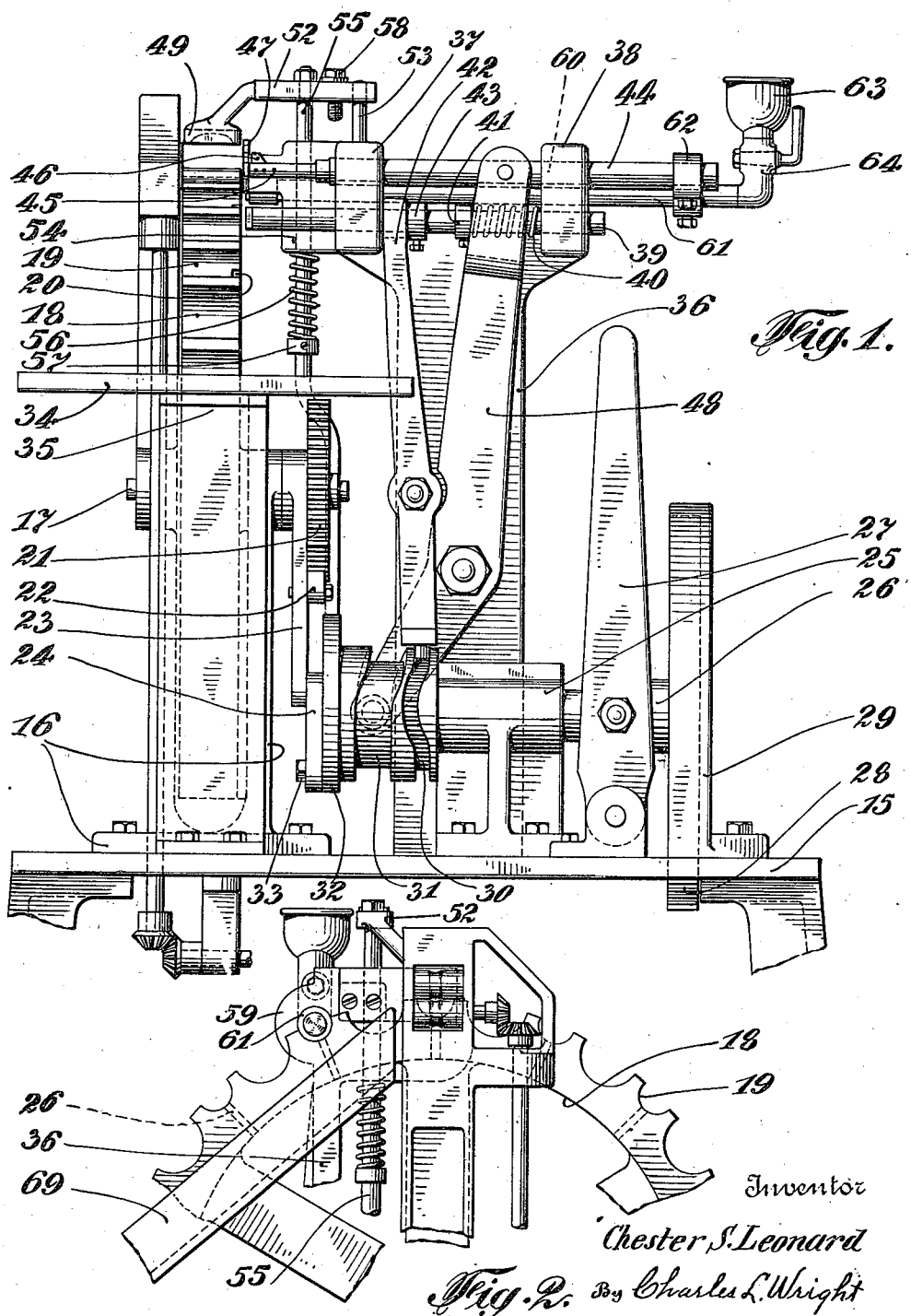

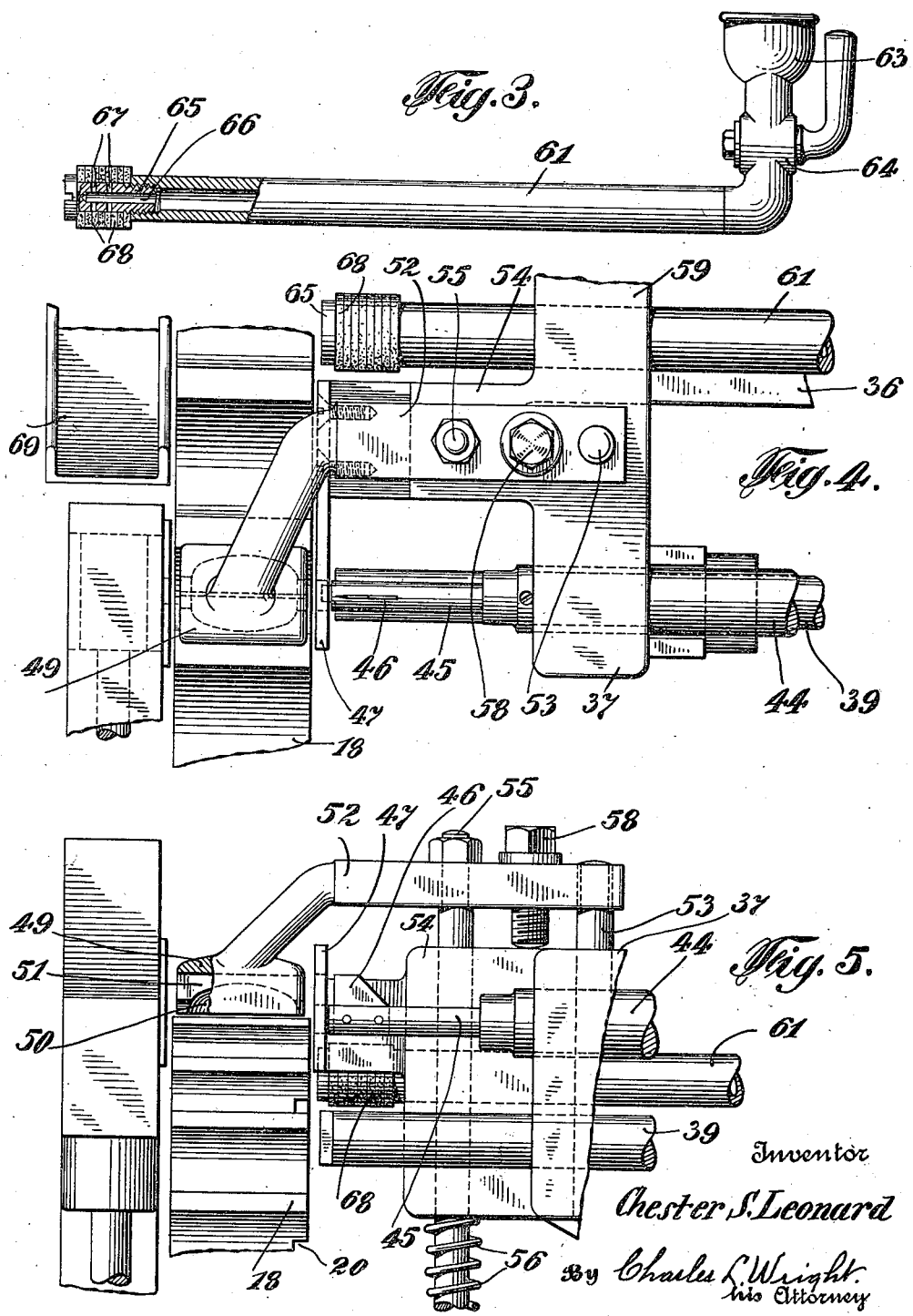

CHESTER S. LEONARD, OF LANSDOWNE, PENNSYLVANIA.

DATE-DEPITTING MACHINE.

1,421,505.   Specification of Letters Patent.   Patented July 4, 1922.

Application filed September 1, 1921. Serial No. 497,463.

*To all whom it may concern:*

Be it known that I, CHESTER S. LEONARD, a citizen of the United States, and a resident of Lansdowne, in the county of Delaware and State of Pennsylvania, have invented certain new and useful Improvements in Date-Depitting Machines, of which the following is a specification.

One of the purposes of the present invention is to provide a mechanism for ejecting the seed pits or stones from fruit, such as dates, in a viscid, partially dry state, the same being an improvement over my earlier Patent No. 1,392,690 issued October 4th, 1921.

Another object is in the provision of means for more securely holding the fruit while undergoing the depitting operation.

A further object is to provide means for moistening or lubricating the fruit receiving recess to prevent the fruit adhering therein.

Another important purpose is to provide means for shearing or slicing the fruit, coincidentally with extruding the stone, thereby fully preparing it to receive any desired artificial filling, in place of the pit, in a convenient manner.

These and other like objects, hereafter indicated, are attained by the novel construction and arrangement of parts and their operation, later described in detail, and shown in the annexed drawings, forming a material part of this disclosure, and in which:—

Figure 1 is a fragmentary side elevational view of the machine.

Figure 2 is a fragmentary front view.

Figure 3 is a side elevational view of the combined fruit ejector and moistener, partly in section.

Figure 4 is an enlarged partial plan view showing the material features of the improvements.

Figure 5 is a side view of the same.

In the drawings the numeral 15 designates a platform or bench on which the machine is erected.

Near one end of the platform are bolted a pair of opposed brackets 16 in which is journalled a spindle 17 having keyed upon it, between the brackets a spoked conveyor wheel 18, having equally spaced radial elevations on its rim containing cavities 19 suited to receive a single piece of the fruit to be depitted and on the side of the rim, adjacent the mechanism, are radial grooves 20 engaged by a detent as will later be seen.

The inner extending end of the spindle has fixed on it a ratchet wheel 21, operated by a pawl 22 pivoted on an arm 23 rotatable on the spindle 17, the opposite, free end of the arm being connected with a link 24.

An elongated pillow block 25, fixed to the platform 15, affords a bearing for a shaft 26 upon which is mounted a clutch, (not shown) operated by the handle lever 27 in engaging or disengaging the shaft with respect to a drive wheel 28 shown covered by the guard 29.

Upon the opposite end of the shaft 26 is fixed a cylinder containing cam grooves 30 and 31 and having at its outer end a flange constituting a peripheral cam 32, this cam also having in its outer side a crank pin 33 engaging the link 34.

Thus, as the number of teeth in the ratchet wheel 21 correspond with the number of cavities in the conveyor wheel 18, each full turn of the shaft 26 will advance the cavities consecutively and intermittently past a given point, as for instance the feed table 34, supported on a bracket 35 from the platform, and from which the cavities are charged with a single date during the intermissions of rotation of the wheel.

Extending up from the platform 15 is a standard 36 having at its upper end a pair of spaced projections 37 and 38, the former being adjacent the ring of the wheel 18, both being bored to receive a rod 39 having a detent point adapted to engage the grooves 20 into which it is projected by a compression spring 40 encircling the rod and abutting respectively the projections 38 and a collar 41 secured to the rod.

This detent rod is withdrawn at proper intervals by a forked lever 42 pressing against the collar 43, secured on the rod adjacent the projection 37, the lever being pivoted on the standard 36 and engaged at its lower end to a roller operating in the cam groove 30, which is so timed as to retract the detent during the transmission of movement to conveyor wheel.

Directly above the rod 39 is a bar 44, slidably mounted in the projections 37 and 38, in axial alinement with the centers of the cavities 19, as they move to the highest point, and fixed in the front end of the bar is a plunger 45 adapted to pierce the fruit and eject the pit when advanced.

A knife blade 46 is fixed in the forward end of the plunger to slit the fruit lengthwise, this operation obviously being accomplished simultaneously with piercing it, and a guard or stripper plate 47, fixed in any convenient manner to the machine, is provided to clear the plunger and knife of any adhering matter upon the outward movement of the bar.

Motion is communicated to the bar by a forked lever 48, its fork straddling the rod 39, the lever being pivoted to the standard 36 and engaged at its lower end to a roller actuated by the cam groove 30.

In order to hold the fruit securely in the cavities 19, while undergoing the piercing and slicing operation, a clamp head 49, containing in its lower side a concave recess 50, suited to engage the fruit, is used.

This head has a slot 51 through which the knife passes and is carried by an arm formed with a bar 52 mounted to slide up and down upon a guide pin 53 fixed in an extension 54 of the standard 36 and actuated by a rod 55 fixed in the bar and passing through the extension, downward to engage the cam 32 by which the clamp is periodically raised.

The clamp is normally drawn down to engage the fruit by a compression spring 56, encircling the rod 55 and abutting the extension and a collar 57 adjustably secured on the rod therebelow.

An adjusting screw 58, in the bar 52, limits the downward movement of the clamp by making contact with the extension at its point.

Another pair of projections 59 and 60 extend rearwardly from the standard 36 bored to receive a hollow sliding plunger 61, connected to the sliding bar 44 by a yoke 62 so as to move in unison with it.

On the outer end of the plnger is a capped cup 63 communicating with the bore of the plunger, a cock 64 controlling the passage therebetween.

In the opposite end of the plunger, which is positioned to align with the cavities 19 of the conveyor wheel, at a point past the piercing plunger, is a screw 65, its body drilled axially from the inner end, as at 66, and also transversely, as at 67, this screw compressing fibrous rings 68, between its head and the end of the plunger, in such manner as to maintain the rings in a saturated or moistened condition from fluid contained in the cup.

This plunger acts as a knock-out for the piece of fruit previously pierced, depitted and slit, and at the same time lubricates and cleanses the cavity, preventing the next successive fruit to be entered from sticking therein.

A chute 69 is arranged to receive the fruit ejected by the plunger, the same leading angularly downward to a receiver, and means are provided to positively grip and eject the pits or stones outward of the machine.

In operation the fruit is distributed on the table 34 and entered, one at a time, into the cavity in the wheel rim, at that moment in register with the surface of the table. The wheel, at that instant, is held stationary by the detent 39 engaging one of the recesses or grooves 20, which, upon being retracted by the cam 30, allows the wheel to be advanced by the crank actuated pawl and ratchet to bring another cavity into position for loading.

When the fruit arrives at the uppermost point of the wheel, after the detent has locked the same temporarily from further rotation, the cam 32 permits the head 49 to clamp the fruit sufficiently to hold it tightly in the cavity, and thereupon the ejector plunger 45 and knife are moved forwardly by the cam 31, forcing the pit outward past the side of the wheel, where it is grasped by suitable devices and carried away, the plunger and knife being instantly retracted through the stripper plate 47 which clears them of any adhering particles of the fruit.

Simultaneously the ejecting plunger 61 is advanced, making contact with the fruit previously depitted, in the next adjacent cavity, and pushing it out to drop into the chute 69 leading to a receiver where the pierced and slit fruit is collected.

The rings 68 of the ejector plunger perform the function of a brush, moistening the walls of the cavities with the liquid carried in the cup 63, which acts as a lubricant and thoroughly cleanses the cavities for the further reception of fruit.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

Having thus described my invention, what I claim as new and desire to secure by Letters Patent, is:—

1. In a fruit stoning machine, the combination with a rotary fruit conveyor having recesses receptive of the fruit, of a power driven reciprocating plunger adapted to pierce the fruit in a horizontal plane and expel the stone, and a single knife combined with said plunger adapted to slit the fruit on one side only.

2. In a fruit stoning machine, the combination with a fruit conveyor having recesses receptive of the fruit, of means for ejecting the stone from the fruit, means for expelling the fruit from the recesses of said conveyor, and means for moistening, lubricating and cleansing the recesses co-incidentally with expelling the fruit therefrom.

3. A fruit stoning machine comprising an intermittently actuated conveyor wheel having uniformly spaced semi-circular grooves in its face, means for clamping fruit entered into said grooves, a plunger for expelling the stone from the fruit while clamped, a knife carried by said expelling plunger for slitting the fruit, said knife passing through a slot in said clamping means, and means for stripping said plunger and knife upon their outward stroke.

4. A fruit stoning machine comprising an intermittently actuated conveyor wheel having uniformly spaced semi-circular grooves in its face, means for clamping fruit entered into said grooves, combined means for expelling the stone and slitting the fruit, a hollow plunger for ejecting the fruit after stoning, a liquid supply carried by said plunger, and means for dispensing the liquid in the grooves of said wheel.

5. A fruit stoning machine comprising an intermittently actuated conveyor wheel having uniformly spaced, semi-circular grooves in its face, means for clamping fruit entered into said grooves during the intervals of rotation of said wheel, means for expelling the stone from the fruit while held by the clamp, means for ejecting the fruit from the wheel after removal of the stone, and means for wiping the grooves in said wheel.

6. A fruit stoning machine comprising a wheel having spaced recesses in its circumference, means for imparting a partial revolution periodically to said wheel, a concave head adapted to clamp fruit in the recesses of said wheel during its rest, a plunger and knife combined therewith adapted to simultaneously expel the stone and slit the fruit when clamped, timed means for actuating said plunger, and a stripper plate for said plunger and knife.

7. A fruit stoning machine comprising a conveyor wheel having cavities in its rim, means for periodically imparting partial rotation to said wheel, a concave clamp co-operative with the cavities to hold fruit therein, means for actuating said clamp in synchronism with the movements of said wheel, a depitting plunger, means for advancing and retracting said plunger with reference to the clamped fruit, and a knife combined with said plunger for slitting the fruit co-incidentally with depitting the same.

8. A fruit stoning machine comprising a stand, a conveyor wheel having spaced cavities in its rim, a food supply table adjacent said wheel, means for periodically advancing said wheel circumferentially to present the cavities progressively to said table, means for locking said wheel during the intermissions of its movement, a concave head adapted to clamp articles in the rim cavities during its periods of rest, means for raising said head immediately prior to imparting movement to said wheel, adjustable means for limiting the clamping effect of said head, and a reciprocating plunger movable into and out of the space between the cavities and head when said clamp is in a lowered position.

In testimony whereof I have signed my name to this specification.

CHESTER S. LEONARD.